(12) United States Patent
Davies et al.

(10) Patent No.: US 8,265,488 B2
(45) Date of Patent: Sep. 11, 2012

(54) ELECTROMAGNETIC TRANSMISSION/RECEPTION SYSTEM

(75) Inventors: Phillip Anthony Davies, Kent (GB); Nathan Joseph Gomes, Kent (GB); Pengbo Shen, Kent (GB)

(73) Assignee: University of Kent, Kent (GB)

( * ) Notice: Subject to any disclaimer, the term of this patent is extended or adjusted under 35 U.S.C. 154(b) by 755 days.

(21) Appl. No.: 11/629,647

(22) PCT Filed: Nov. 29, 2004

(86) PCT No.: PCT/GB2004/005024
§ 371 (c)(1), (2), (4) Date: Dec. 20, 2007

(87) PCT Pub. No.: WO2005/125060
PCT Pub. Date: Dec. 29, 2005

(65) Prior Publication Data
US 2008/0212974 A1    Sep. 4, 2008

(30) Foreign Application Priority Data
Jun. 18, 2004  (GB) .................................. 0413716.2

(51) Int. Cl.
*H04B 10/00* (2006.01)
(52) U.S. Cl. ......... 398/140; 398/128; 398/130; 398/141
(58) Field of Classification Search .......... 398/115–117, 398/140–172
See application file for complete search history.

(56) References Cited

U.S. PATENT DOCUMENTS

| | | | | |
|---|---|---|---|---|
| 4,932,775 A * | 6/1990 | Wissman et al. | ............ | 356/5.09 |
| 5,408,349 A * | 4/1995 | Tsushima et al. | ............... | 398/95 |
| 5,534,993 A * | 7/1996 | Ball et al. | ..................... | 356/5.09 |
| 5,710,651 A * | 1/1998 | Logan, Jr. | ..................... | 398/168 |
| 5,923,458 A * | 7/1999 | Fuse et al. | ..................... | 359/278 |
| 6,349,103 B1 | 2/2002 | Chung et al. | | |
| 6,591,026 B2 * | 7/2003 | Endo et al. | ..................... | 385/15 |
| 6,633,371 B1 * | 10/2003 | Lu et al. | .......................... | 356/72 |
| 6,791,734 B2 * | 9/2004 | Izadpanah | ..................... | 359/245 |
| 6,850,710 B1 * | 2/2005 | Mells | ............................ | 398/163 |

(Continued)

FOREIGN PATENT DOCUMENTS
EP    1 233 527    8/2002
(Continued)

*Primary Examiner* — Agustin Bello
(74) *Attorney, Agent, or Firm* — Blakely, Sokoloff, Taylor & Zafman (57) ABSTRACT

An electromagnetic transmission and reception system comprises a transmitter section and a receiver section. The transmitter section has a first signal source, a second signal source at a lower frequency than the first signal source, and means for generating from the first and second signal sources a plurality of signals with fixed frequency spacing derived from the second signal source frequency. One or more pairs of the plurality of signals are selected, and for the or each pair, the signals of the pair are combined to derive an output signal having a frequency derived from the difference between the frequencies of the signals of the pair. The receiver section combines a received signal, which comprises a received version of the output signal, with a local oscillator signal for frequency down-conversion of the received signal. This local oscillator signal is generated by the transmitter section. This provides a system in which the generation of signals of the desired frequency is achieved by mixing signals of specific frequencies. The reception uses frequency down-conversion using the same signal sources as used for the transmission. This enables a low noise system to be implemented.

27 Claims, 5 Drawing Sheets

U.S. PATENT DOCUMENTS

| | | | |
|---|---|---|---|
| 6,867,904 B2 * | 3/2005 | Ng et al. | 359/332 |
| 6,909,855 B2 * | 6/2005 | Fuse et al. | 398/204 |
| 7,020,396 B2 * | 3/2006 | Izadpanah et al. | 398/66 |
| 7,418,205 B2 * | 8/2008 | Litvin | 398/77 |
| 7,561,807 B2 * | 7/2009 | Doerr et al. | 398/188 |
| 7,603,037 B2 * | 10/2009 | Sayyah | 398/91 |
| 7,650,080 B2 * | 1/2010 | Yap et al. | 398/183 |
| 2003/0197918 A1 * | 10/2003 | Ng et al. | 359/332 |
| 2005/0018724 A1 * | 1/2005 | Da Silva et al. | 372/32 |
| 2008/0212974 A1 * | 9/2008 | Davies et al. | 398/140 |

FOREIGN PATENT DOCUMENTS

| | | |
|---|---|---|
| GB | 2 381 121 | 4/2003 |

\* cited by examiner

ELECTROMAGNETIC TRANSMISSION/RECEPTION SYSTEM

This is a non-provisional application claiming the benefit of International application number PCT/GB2004/005024 filed Nov. 29, 2004

BACKGROUND OF THE INVENTION

This invention relates to electromagnetic transmission and reception systems, and relates specifically to the transmission and reception of signals in the Terahertz (THz) radiation band.

Terahertz radiation represents the last band of the radio wave and light spectrum which has not been extensively used for communications systems and other applications. Until recently, bright sources of light and sensors have not been available for this frequency band. The Terahertz band is generally considered to cover the range from 100 GHz ($10^{11}$ Hz) up to roughly 30 THz ($3\times10^{13}$ Hz), and this corresponds to wavelengths from approximately 3 mm to sub-millimeter wavelengths of approximately 0.01 mm. The use of the term Terhertz in this application is intended to cover this range.

The lower frequency limit lies just above the microwave region where satellite dishes and mobile phones operate, whereas the upper limit is located adjacent to infrared frequencies used in devices such as television remote controllers. Conventional microwave sources do not operate at sufficiently high frequency to efficiently produce radiation in the gap, whereas laser diode sources have been limited by thermal effects.

Two "laser-based" methods of THz generation have recently been developed. Some development has taken place for "true" THz lasers, which involves making materials which can emit at these frequencies (this is at a very primitive stage). The use of ultra-short pulses generated in optical/infrared lasers is, however, more advanced. These pulses are then detected in semiconductor (often cooled) devices and then radiated. This results in low power sources with a broad spectral content up to THz frequencies, providing sufficiently short pulses are used.

The use of Terahertz frequency light is particularly suitable for a number of applications, such as the imaging and chemical analysis of a variety of objects, including human tissue for potential medical applications. Non-medical applications include security screening and non-destructive testing, as materials such as plastics, clothing, cardboard, and semiconductors are transparent to Terahertz radiation.

For imaging applications, these millimeter and sub-millimeter wavelengths allow for the distinction between a wide variety of material features, and also offer good resolution.

Conventional imaging at these frequencies only detects the intensity of the reflected signal, by a detector or detector array. Methods to decrease the coherence level are regarded as essential in order to achieve good images, such methods including polarisation diversity, and random pattern creation (e.g. from coarse reflectors). A coherent source gives a complex amplitude function and it is then appropriate to detect the reflected signal using coherent detection, wherein both the intensity and the phase of the detected signal are recovered. Accurate control of the frequency is also desired to provide a better spectral resolution resulting in increased information content for the images.

The Terahertz frequency band can also potentially be used in wireless communications systems, particularly line of sight communications. In wireless communications applications, moving to higher frequencies can provide more bandwidth and hence increased data transmission speeds. However, in such a system, which would typically be fed from an optical fibre distribution network, the data rate per channel is limited by the chromatic dispersion in the fibre.

This invention relates particularly to a generator and coherent receiver for signals including signals in the Terahertz band. Existing light sources for this band, as described above, are relatively broad spectral sources, and thus offer weak power spectral density and unstable frequency of illumination. For a coherent imaging technique, a much more stable source is required and with a high spectral density of the illumination, in order to reduce the required overall signal to noise ratio.

SUMMARY OF THE INVENTION

According to the invention, there is provided an electromagnetic transmission and reception system, comprising a transmitter section and a receiver section, wherein the transmitter section comprises:

a first signal source;

a second signal source at a lower frequency than the first signal source;

means for generating from the first and second signal sources a plurality of signals with fixed frequency spacing derived from the second signal source frequency;

means for selecting one or more pairs of the plurality of signals; and for the or each pair, means for combining the signals of the pair to derive an output signal having a frequency derived from the difference between the frequencies of the signals of the pair, and wherein the receiver section comprises means for combining a received signal, which comprises a received version of the output signal, with a local oscillator signal for frequency down-conversion of the received signal, wherein the local oscillator signal is generated by the transmitter section.

The invention provides a system in which the generation of signals of the desired frequency is achieved by mixing signals of specific frequencies. The reception uses frequency down-conversion using the same signal sources as used for the transmission. This enables a low noise system to be implemented.

In particular, the invention enables the implementation of a system able to generate ultra-low noise signals and to coherently receive such signals. The system has applications in a range of areas, for example for imaging (including radar type applications), communications and component testing/analysis. The invention is suitable for very high frequency signals, up to the THz range. For example, the output signal may have a frequency in the range 100 GHz to 30 THz, for example in the range 100 GHz to 500 GHz The invention facilitates the generation of ultra-low noise signals with stable coherent detection in this frequency range.

The local oscillator signal may be generated by the transmitter section from a pair of the plurality of signals. Thus, the local oscillator signal is generated from the same signal sources as the output signals, which improves noise performance. For example, the local oscillator signal can differ from the output signal frequency by the frequency of the second signal source.

The frequency down-conversion can be down to the frequency of the second signal source, and the receiver section can then further comprise circuitry for converting the frequency down-converted signal to baseband, using the second signal source.

The first signal source preferably comprises a stable master laser, and the second signal source preferably comprises a microwave reference source (for example of 5 GHz-40 GHz frequency).

The plurality of signals may be generated by an optical frequency comb generator, for example in the form of an optical fibre ring device.

The system of the invention may be an imaging apparatus. However, the system may instead be a wireless communications system.

For communications applications, system of the invention can act as a single sideband system, where the data carrying signal only has limited spectral width. The carrier frequency can be provided subsequent to fibre transmission by the mixing of the data carrying signal and a photonic reference signal. Spectral interleaving techniques can be utilised to improve the spectral efficiency.

In a communications system, the means for combining the signals of a pair can combine a data-modulated one of the plurality of signals with a non-data-modulated one of the plurality of signals.

The invention may instead be used in a network analyser.

The invention also provides a method of transmitting and receiving an electromagnetic signal, comprising:
generating an output signal, by:
generating a plurality of signals with fixed frequency spacing;
selecting one or more pairs of the plurality of signals; and
for the or each pair, combining the signals of the pair to derive an output signal having a frequency derived from the difference between the frequencies of the signals of the pair;
transmitting the output signal; and
receiving a signal, which comprises a received version of the output signal, by down-converting the frequency of the received signal, using a local oscillator signal which is derived from the plurality of signals with fixed frequency spacing.

BRIEF DESCRIPTION OF THE DRAWINGS

Examples of the invention will now be described in detail with reference to the accompanying drawings, in which.

DETAILED DESCRIPTION

This invention relates to the generation and reception of electromagnetic signals, in which high frequency signals are generated and detected using a laser and a microwave signal source. The microwave signal source is used to generate multiple signals, separated by the microwave frequency. Selected pairs of these signals are combined to generate the desired high frequency signals, and a local oscillator is also generated and used for frequency down-conversion.

In this way, the invention provides ultra-low-noise signal generation through optical heterodyning. Optical heterodyning is a method for generating high-frequency signals which is limited (in terms of bandwidth and output power) only by the photodetector used. The high-frequency signal generated is the difference frequency between two laser frequencies, and can be easily varied using tunable (e.g. semiconductor) lasers. However, the laser noise will appear in the output difference frequency signal, and this can be very high in electronic terms (linewidths of tens of MHz for semiconductor lasers, tens of kHz at least for even ultra-stable external cavity lasers).

Techniques for correlating the noise in the lasers (i.e. locking them) are thus required. Various techniques have been proposed, including optical injection locking to a modulation sideband, optical phase locked loops and a combination of such techniques in an optical injection phase locked loop.

An optical frequency comb generator (OFCG) can provide multiple, correlated optical signals for the heterodyne generation of high frequency signals.

For stable, coherent detection, the invention uses the generation of two or more high frequency signals, generated through optical heterodyning, where one signal is used as the local oscillator (LO) for the other(s). By generating the signals in the same system, the noise correlation leads to low-noise detection.

The application of the invention to a number of different systems will now be described in more detail. The principal of operation of the invention will become clearer from the first example of FIG. 1, which shows the invention applied to a THz imaging system.

Figure 1:
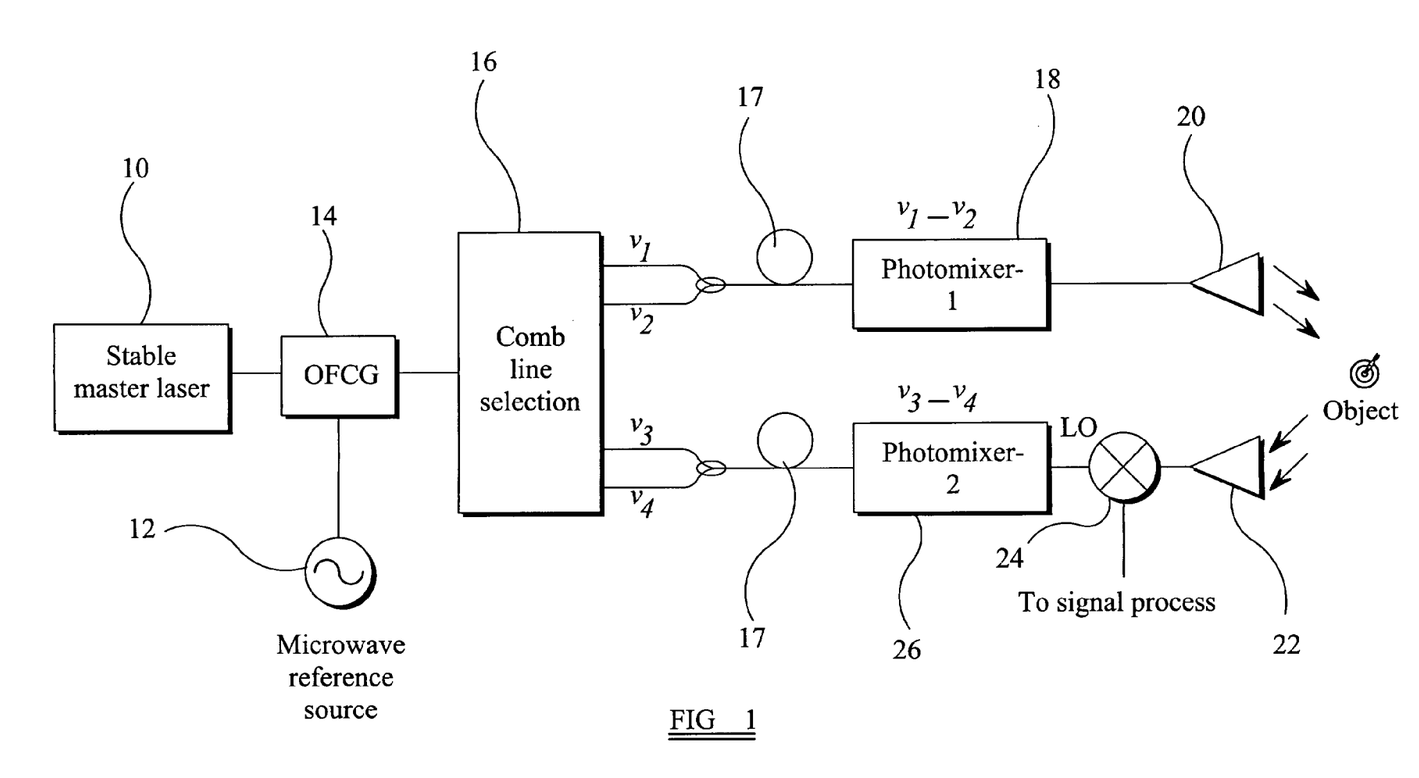
FIG. 1 shows the invention applied to a THz imaging system.

In the imaging system of FIG. 1, a stable maser laser 10 defines one stable operating point of the system. This laser output and the output of a microwave source 12 is supplied to an optical frequency comb generator (OCFG) 14. For example, the laser output frequency may be in the optical C-band of wavelength approximately 1550 nm, and the microwave frequency may for example be 15 GHz. The OFCG generates a number of frequency components separated by the 15 GHz microwave frequency, and thus generates a coherent optical comb. There may be of the order of hundreds of these frequency components ("comb lines"), so that differences in frequency of the order of THz exist between pairs of the comb lines.

A comb line selection unit 16 selects pairs of these comb lines to generate desired frequencies from them, using a photomixer 18, which in turn drives a transmitter 20. The comb line selection unit 16 thus combines comb lines together in a manner such that the difference frequencies generated are the frequencies needed for the imaging illumination and the local oscillator. Internal connections of the signals is by means of low loss optical fibres 17. In FIG. 1, a first pair $v_1$ and $v_2$ is shown and a second pair $v_3$ and $v_4$.

A received signal at receiver 22 is supplied to an electrical mixer 24 which is used to down-convert the frequency to frequencies which can then be processed more easily. For this down conversion operation, the comb line selection unit is also used to generate a local oscillator signal (LO) by mixing of a pair of comb lines in photomixer 26. The millimeter/sub-millimeter wavelength signals can be detected by different photomixers, as shown.

The invention allows comb lines from an optical frequency comb generator (OFCG) to be used to generate spectrally pure signals in the terahertz frequency band. A pair of comb lines is used to produce one such signal by their detection at a high speed photomixer. Many such signals can be generated with a relatively small and known frequency spacing between them. Some of the signals are used for transmission, with others being used as local oscillator (LO) signals for coherent reception of the former. Employing distribution by low loss optical fibre 17, many remote detectors can be powered by one source, working at the same or different millimeter-wavelength to THz frequencies. The noise correlation between all comb lines results in ultra-low phase noise signals being generated, and in low noise coherent reception.

Figure 4:
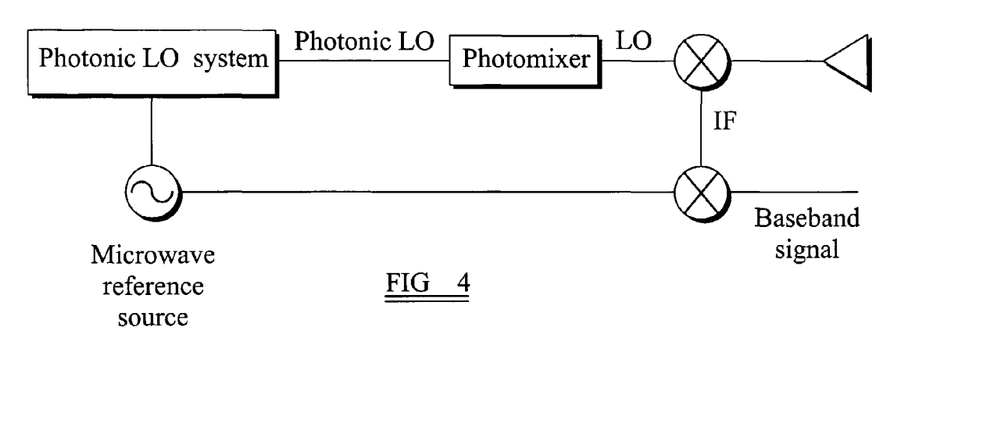
FIG. 4 is used to explain the frequency down-conversion in the receiver in more detail.

In FIG. 1, an example is shown in which 4 different comb lines are selected; however, only 3 different comb lines might be used, e.g. $v_2$ and $v_3$ may be the same frequency. Either homodyne detection or heterodyne detection can be realized. Tight phase control of the local oscillator may be required for detection in case of the homodyne system. In the case of the heterodyne system, further signal processing is needed and it is possible to take advantage of the carrier frequency being equal to the RF reference frequency or an integral multiple thereof (FIG. 4).

The fundamental operation of the system explained above applies to all implementations of the invention.

Figure 2:
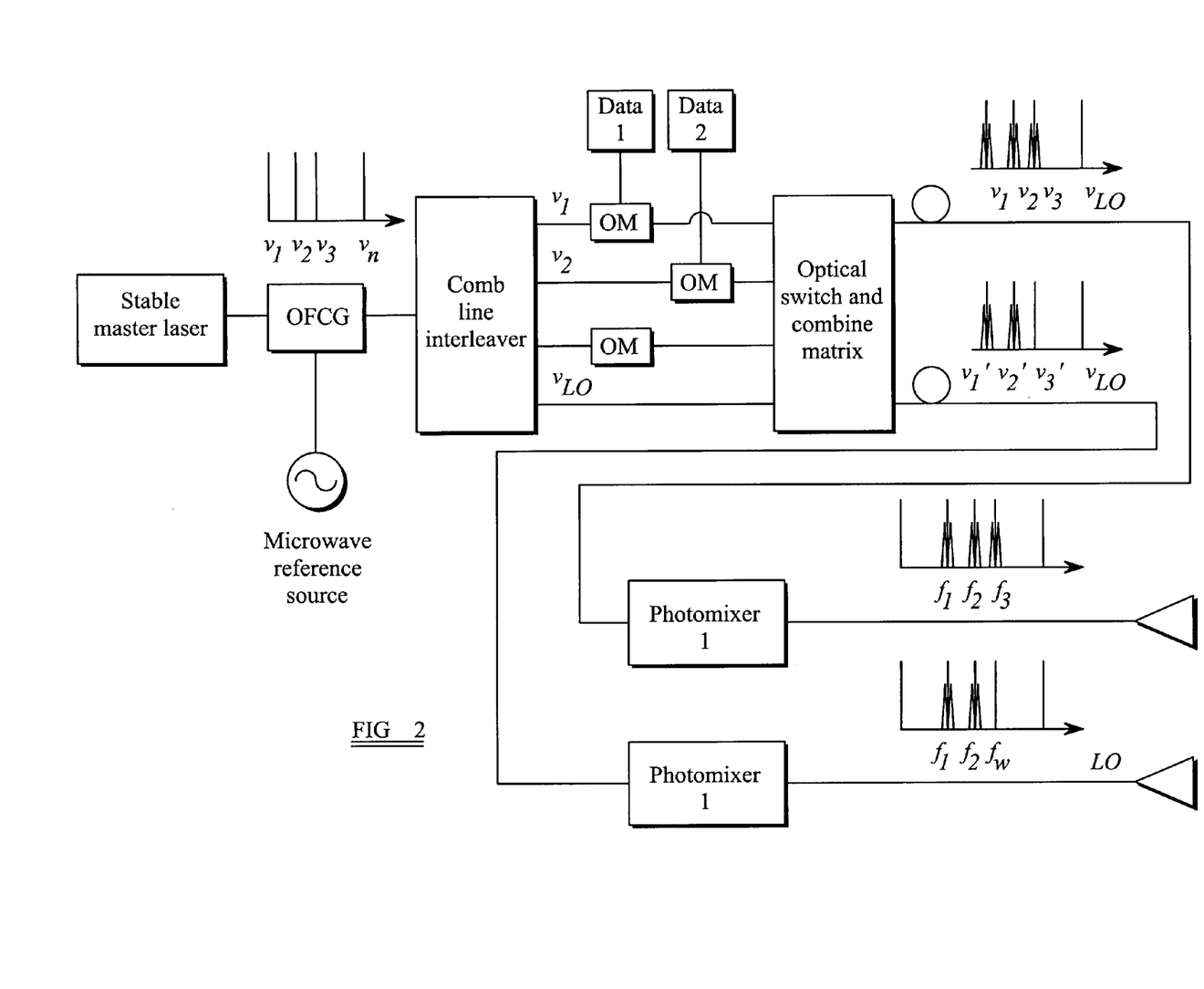
FIG. 2 shows the invention applied to a wireless communications system.

FIG. 2 shows the system as used in the wireless communication application. The comb lines to be used for the transmission of data have data modulated onto them by optical modulators (OM). An un-modulated comb line is sent along with the many modulated ones. At the transmit photomixer, these modulated comb lines are mixed with the unmodulated one and produce a set of electrical (millimeter/sub-millimeter-wave) signals. In the example shown, three comb lines $v_1$ $v_2$ and $v_3$ are combined with one local oscillator comb line $v_{LO}$ to generate three THz output signals $f_1$, $f_2$ and $f_3$.

The chromatic dispersion between the reference lightwave $v_{LO}$ and the data-carrying comb line is converted as a fixed phase difference on the detected signals. Therefore, dispersion only affects the signal within the bandwidth of the data signals.

To assist further the detection of the uplink signal, a millimeter-wave LO signal can be also transmitted, and this is shown in the lower part of FIG. 2.

Thus, the top and bottom parts of FIG. 2 show different alternative transmission techniques. In the lower part of FIG. 2, $v_3'$ is not modulated—when optically heterodyned with $v_{LO}$ it produces the millimeter-wave LO signal $f_{LO}$.

Reception is not shown in FIG. 2. In the case where the local oscillator signal is transmitted, this reception would be in a similar manner to FIG. 1 (and FIG. 4).

Figure 3:
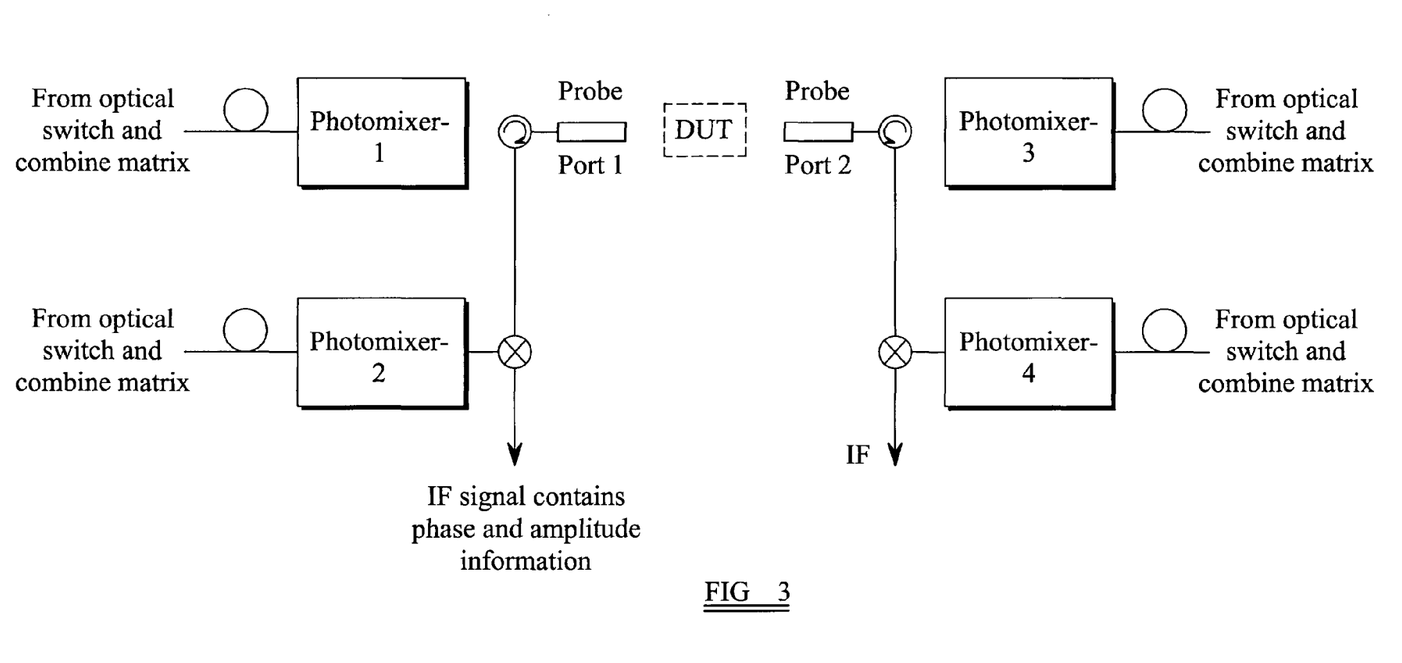
FIG. 3 shows the invention applied to a network analyser.

FIG. 3 shows the principle of the system used as a high frequency network analyser. Separate photomixers are used at each port to generate the required transmit and LO signals. The fibre feeds to these photomixers provide system flexibility. Frequency sweeping can be performed by comb line selection for coarse control and by tuning the comb line spacing for finer resolution. Received millimeter-wave signals (either after transmission through or reflection from the DUT) are down-converted by the LO millimeter-wave signals to a microwave IF frequency which is equal to the RF reference frequency used in the comb line generation. This is a heterodyne detection scheme; the equivalent homodyne system might also be considered.

FIG. 4 shows that processing of the down-converted intermediate frequency (IF) signal can be implemented by using the microwave reference signal (used in the OFCG) to down convert the microwave difference frequency signal between the THz received signals and the THz LO signals to baseband. For the operation of FIG. 4, the transmit/receive and LO THz signals are separated by the microwave reference frequency (and this can be achieved by appropriate selection of the pairs in the comb line selection unit); although they can, in fact, be separated by any harmonic of the microwave (RF) reference frequency. The mixer used to generate the baseband signal can then be a harmonic mixer.

Any or all of the THz signals may have been generated by heterodyne detection in photomixers after comb line selection from the OFCG as described previously.

It will now be apparent from the above description that the invention provides a system comprising a synthesiser/generator of stable, ultra-low phase noise signals up to THz frequencies and a coherent receiver of such signals providing ultra-low noise detection. The complete system comprising the synthesiser/generator and receiver is based on an optical frequency comb generator (OFCG) stabilised to a stable, narrow linewidth laser, particular line selection choices and methods, photomixers to detect the high frequency signals, a very low phase noise microwave signal source which acts as a generator of the system reference frequency. Additional techniques such as optical modulation methods will be employed dependent on the application.

The transmit signal and the LO signal can be generated simultaneously in the system and distributed, by the same fibre using wavelength division multiplexing (WDM) or by different fibres, to different photomixers to recover the signals. When these THz transmit and LO signals are heterodyned in a microwave mixer, the difference frequency is precisely related (and may be precisely equal to) the original microwave system reference frequency, used for the signal generation in the OFCG, as shown in FIG. 4. The noise correlation between the difference frequency and the microwave system reference frequency allows ultra-low noise signal down-conversion in the recovery of the baseband information.

A more complete description of the components which can be used to implement the invention will now be presented.

OFCG and Stable Narrow Linewidth Reference Laser

The system of the invention relies on the stable operation of an OFCG, this stability being in terms of both the comb line separation and their absolute wavelength, and in terms of continuous low-noise operation.

Figure 5:
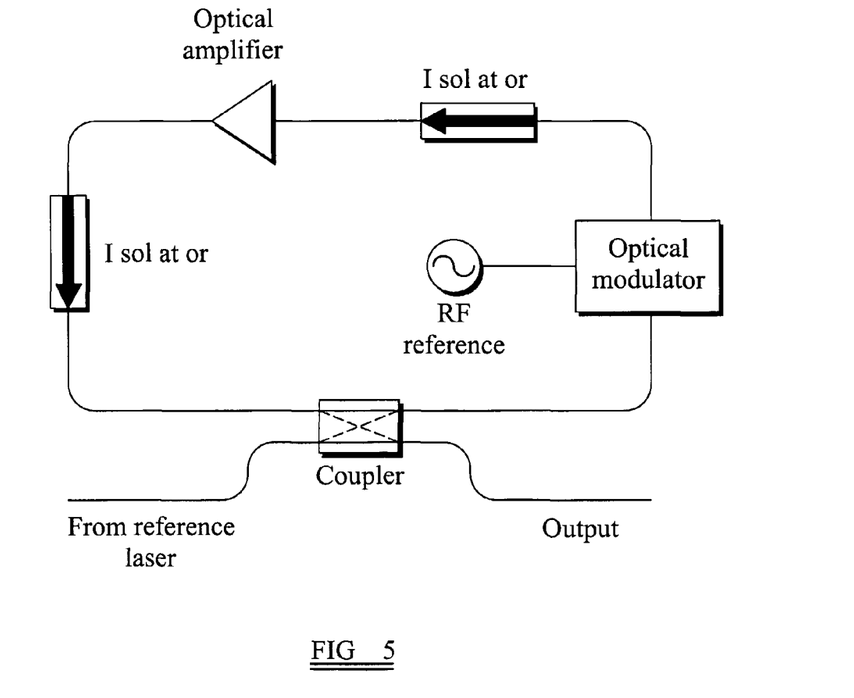
FIG. 5 shows schematically the design of optical frequency comb generator used in the system of the invention.

A simplified block diagram showing the key components of a fibre ring based OFCG is shown in FIG. 5, in which an example of optical frequency comb generator in the form of optical fibre ring device is given.

The device comprises a 2×2 coupler, a first input port being supplied with the first master laser output and a first output port providing the output of the comb generator. A second input port and a second output port are coupled together by the fibre ring, which is shown as having an optical amplifier, two isolators and an optical modulator driven by an RF source (i.e. the microwave reference source).

For absolute wavelength stability, the OFCG is locked to the stable master reference laser. A tunable, narrow linewidth reference laser allows for tracking of OFCG resonator variations and for spectrally pure comb lines. The use of a narrow linewidth reference laser avoids the presence of several sub-modes at each comb line; such sub-modes give rise to mode partition noise and increased close-to-carrier noise of the sub-millimeter-wave signals.

Using a stable, narrow linewidth laser as the reference laser, together with a relatively long polarisation maintaining ring cavity (>20 cm), with tunable optical delay line and fibre stretcher, and tracking loop, such an OFCG can produce completely tunable, stable, and narrow linewdith comb lines, and can provide continuous frequency coverage from GHz to THz ranges. Phase locked loop correction systems may be required within the OFCG in order to maintain stable operation.

Figure 6:
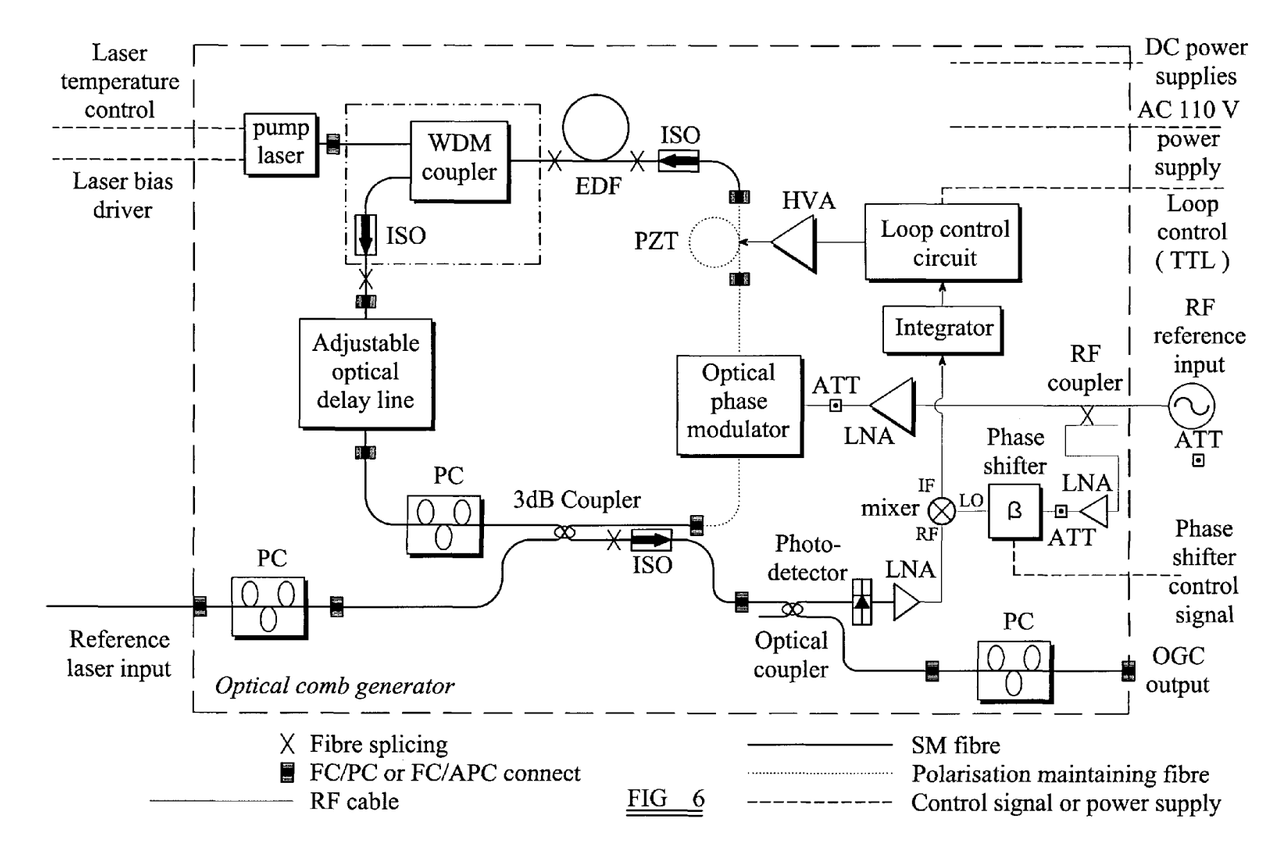
FIG. 6 shows in more detail one example of design of optical frequency comb generator.

FIG. 6 shows in more detail an implementation of the OFCG including the refinements outlined above. The device of FIG. 6 is locked to a stable, narrow linewidth master laser and uses correction systems for stable operation. Feedback loop length control is required, by active temperature control to compensate the slow drift induced by environmental changes, and by a fast polarisation maintaining fibre stretcher to correct for acoustic noise. The ring length correction system is for fast (acoustic) fluctuations and slower (environmental) changes. It is desirable to use polarisation maintaining fibre for the whole ring (in FIG. 6 it is used because of the polarisation sensitivity of the modulator). An erbium doped fibre amplifier is used to provide the gain in the fibre ring in FIG. 6, but the use of any type of optical amplifier is possible. If a stable, fixed phase central optical comb line is desired a dual coupler configuration (with a second coupler in the fibre ring) may be employed, and this avoids the ambiguous phase relationship between the reference laser and the other comb lines at the output.

Each of the comb lines generated from the OFCG described, is a single mode, stable and narrow linewidth lightwave, and with their phase noises correlated. The comb line separation is locked to a stable microwave or millimeter-wave reference frequency source. Inserting a high-saturation power optical amplifier, makes the OFCG capable of providing high output power, and reduces the power requirement of the reference master laser.

The OFCG shown in FIG. 6 will not be described in further detail, as the basic elements have been outlined above, and the functionality will be apparent to those skilled in the art. There are a number of variations to the specific OFCG design above, some of which are outlined below.

An optical frequency comb generator (OFCG) provides optical frequency references (with correlated noise) for the system. The OFCG described is based on a fibre ring. Other fibre ring based OFCGs can be used, such as those using broader linewidth optical sources, easing the tolerance on ring cavity length (and its stability with environmental changes). However, as stated above, such a configuration will generate signals with higher close-to-carrier noise due to mode partition. Tunable frequency generation/synthesis can be achieved by using spectral comb lines from the OFCG in optical phase-locked or optical injection phase-locked loops, where an optical frequency source is locked to an offset from one of the comb lines. By making the OFCG itself tunable, the selected frequencies may be comb line frequencies (and not offset from them).

It is not necessary to use a fibre ring based OFCG. For instance, a conventional OFCG based on a short Fabry Perot cavity can also provide the optical frequency comb required. With short Fabry Perot cavities, the requirements on the linewidth and stability of the reference laser are significantly relaxed. On the other hand, the cavity mode spacing is large and the stability of the reference laser frequency with respect to the cavity mode frequencies becomes important. Other techniques such as using the optical nonlinearity of silica fibre to compress the pulse width, or deep optical modulation, including optical phase modulation and optical intensity modulation, can also be used to produce an optical comb for the reference frequencies.

Comb Line Selections: Optical Filter Banks and Optically Injection Locked Lasers Optical filters may be used to select the required comb lines from the OFCG to produce the desired sub-millimeter-wave (or millimeter-wave or THz) signals (using the optical heterodyne detection in the photomixers). Such filters may be of the fibre Bragg grating (FBG) type, but are not limited to this type. A bank of optical filters is required to select the different individual comb lines required. Tunable optical filters (e.g. using tunable FBGs) will provide tunable comb line selection.

The optical filters will provide a level of comb line selection (and suppression of undesired comb lines). To enhance the selection and increase suppression of undesired comb lines, the filter outputs can be used to optically injection lock frequency tunable lasers. This also provides significantly higher optical output power, and thus much higher power sub-millimeter-wave signals (the power of the sub-millimeter-wave signals being proportional to the product of the power of the selected optical comb lines). Tunable lasers (tunable by bias current and/or temperature) can be used to track the tunability in the comb line selection.

Other techniques for enhancing the comb line selection, such as using optical phase locked loops and optical injection phase locked loops may also be considered, but will add to the system complexity.

Photomixers

The photomixers used provide the fundamental limit to the upper, sub-millimeter-wave/THz frequency that can be generated by the optical heterodyne detection. Photomixers consisting of high-speed photodiodes embedded in millimeter-wave waveguide structures have been used to obtain optical heterodyne detection up to 1 THz. Optimised devices may extend this frequency range further and improve the efficiency of the photomixing process at high frequencies.

Optical Switch and Combine Matrix to Control or Re-Distribute the Comb Lines to Different Destinations An optical switch and combine matrix allows selection of particular comb lines for different destination photomixers, thus controlling the millimeter-wave/THz frequency generated at each photomixer.

Such switching matrices may be implemented as arrays of (integrated) electro-optic Y-branch Mach-Zehnder modulator/switches or by arrays of optical (mirror-based) MEMs switches, but are not limited to components of these types.

Polarisation control through the switching and combining matrix may be required, as polarisation fluctuations in the alignment between the two lightwaves will degrade the millimeter wave/THz output power.

When using a stable, narrow linewidth reference laser, the small difference in propagation delay through the switching and combining matrix for two selected comb lines will not degrade significantly the generated millimeter-wave signals.

Control of the selection of the comb lines for the generated mm-wavelength/THz frequency permits a very coarse, but wideband frequency tuning capability (tuning in steps of the comb line spacing).

In communications applications it is also possible to control the radio frequency(ies) used in particular cells, and channel allocation to cells.

Data Modulation by External Modulator

In imaging applications (and for the network analyser application described below) the information to be recovered is generally imparted on to the millimeter-wave or THz radiation by the device under test (DUT).

In communications applications, the information is impressed onto the carrier by a modulator device. When the information rate/modulation rate is low compared to the carrier frequency, as will be generally the case for the system being described, optical single sideband modulation can be used to minimise fibre dispersion effects. In this case an external electro-optic modulator is used to modulate only one of the pair of comb lines used to generate the millimeter-wave or THz signal. The dispersion effects in fibre are then similar to modulation at the baseband information signal frequency only.

As is clear from the description above, there are a number of applications for the system of the invention, some of which are discussed further below.

Coherent Imaging at Millimeter-Wave to THz Frequencies

Comb lines at the desired wavelength spacing can be filtered. To enhance the power at these frequencies, the comb lines are used to optically injection-lock separate narrow linewidth lasers (e.g. semiconductor DFB lasers). The outputs of these lasers, are then heterodyned in photomixers to generate the spectrally pure transmit and local oscillator millimeter-wave, sub-millimeter-wave or THz frequencies. If the optical frequencies are chosen so that, for example, $v_2$ and $v_3$, are adjacent comb lines, and the transmit frequency is generated from $|v_1-v_2|$ and the local oscillator frequency is generated from $|v_1-v_3|$, then their difference frequency will be the frequency of the microwave/millimeter-wave reference source used by the OFCG. This reference can then be used in a subsequent electrical mixer to recover the baseband information from the difference frequency signal with optimum homodyne detection. A similar strategy employing four comb lines is also possible, as shown in FIG. 1, as are strategies employing non-adjacent comb lines and harmonic mixing.

Tunable and swept frequency operation is also possible using the proposed system by employing a tunable OFCG, tunable optical filters, and temperature/current tunable DFB lasers for the injection-locking.

Coherent Optical Communication System

Some of the selected comb lines can be modulated with data (using optical ASK and/or PSK) by an optical external modulator. By sending another un-modulated local oscillator (LO) comb line ($v_{LO}$) along with the modulated ones, high frequency signals (millimeter-wave/sub-millimeter wave) with ASK or PSK modulation (or any combination thereof) can be generated at the remote photomixer. These millimeter wave signals are frequency division multiplexed, providing a multi-channel capability. The millimeter wave frequencies (carrier frequencies) can be easily controlled by controlling/selecting the frequency of the LO comb lines. Channel selection can be effected by controlling the selection of the comb lines used for carrying the data signals.

If need be, an electrical LO signal at the microwave frequency used by the OFCG can also be sent to provide a clock signal or to aid down-conversion of the transmitted signal.

Millimeter-Wave to THz Frequency Fast, Fine Step Network Analyser

By using polarisation maintaining fibre and a low polarisation dependence photomixer, the system can be configured as a network analyser. At each port, a photomixer converts two optical signals (comb lines) into a sub-millimeter wave signal through the optical heterodyne process as discussed previously for a transmit sub-millimeter wave signal. A second photomixer (also receiving two comb lines) at each port is used to generate the sub-millimeter wave LO signal. The fibre feed system also provides flexibility and low loss for the port. The LO signal at each port is used to down-convert the transmitted (from the other port) or reflected (from the same port) sub-millimeter wave signals to a microwave IF. The IF signal for the network analyser is then fixed at the frequency of the reference RF/microwave frequency, in a similar way as described for the imaging system. By measuring the IF amplitude and phase, and comparing to calibrated data, transmission and reflection characteristics of the device under test can be measured. As stated previously, frequency sweeping can be performed by comb line selection for coarse control and by tuning the comb line spacing for finer resolution.

Various modifications will be apparent to those skilled in the art.

The invention claimed is:

1. An electromagnetic transmission and reception system, comprising, a transmitter section and a receiver section, wherein the transmitter section comprises:
    a first signal source;
    a second signal source at a significantly lower frequency than the first signal source;
    a comb generator for generating from the first and second signal sources a plurality of signals simultaneously with fixed frequency spacing between adjacent pairs of the comb line signals, wherein there is a plurality of adjacent pairs of comb line signals, and the fixed frequency spacing is derived from the second signal source frequency;
    means for selecting one or more pairs of the plurality of signals; and
    for the or each pair, means for combining the signals of the pair to derive an output signal having a frequency derived from the difference between the frequencies of the signals of the pair, and wherein the receiver section comprises:
    means for combining a received signal, which comprises a received version of the output signal, with a local oscillator signal for frequency down-conversion of the received signal, wherein the local oscillator signal is generated by the transmitter section.

2. A system as claimed in claim 1, wherein the local oscillator signal is generated by the transmitter section from a pair of the plurality of signals.

3. A system as claimed in claim 2, wherein the local oscillator signal differs from the output signal frequency by the frequency of the second signal source.

4. A system as claimed in claim 3, wherein the means for combining is for frequency down-conversion to the frequency of the second signal source, and wherein the receiver section further comprises circuitry for converting the frequency down-converted signal to baseband, using the second signal source.

5. A system as claimed in claim 1 the first signal source comprises a laser.

6. A system as claimed in claim 5, wherein the first signal source has an output in the optical C-band.

7. A system as claimed in claim 1, wherein the second signal source comprises a microwave reference source.

8. A system as claimed in claim 1, wherein the means for generating a plurality of signals comprises an optical frequency comb generator.

9. A system as claimed in claim 8, wherein the optical frequency comb generator comprises an optical fibre ring device.

10. A system as claimed in claim 9, wherein the optical fibre ring device comprises a 2×2 coupler, a first input port being supplied with the first signal source output and a first output port providing the output of the comb generator, wherein a second input port and a second output port are coupled together by the fibre ring, which comprises an optical amplifier, an isolator and an optical modulator.

11. A system as claimed in claim 10, wherein the fibre ring further comprises an adjustable optical delay line.

12. A system as claimed in claim 1, wherein the means for combining the signals of a pair comprises a photomixer.

13. A system as claimed in claim 1, wherein the means for combining the received signal with a local oscillator signal comprises an electrical mixer.

14. A system as claimed in claim 1, wherein the output signal has a frequency in the range 100 GHz to 30 THz.

15. A system as claimed in claim 1, comprising an imaging apparatus.

16. A system as claimed in claim 1, comprising a wireless communications system.

17. A system as claimed in claim 16, wherein the means for combining the signals of a pair combines a data-modulated one of the plurality of signals with a non-data-modulated one of the plurality of signals.

18. A system as claimed in claim 16, wherein the local oscillator signal is generated by the transmitter section from a pair of non-data modulated signals of the plurality of signals.

19. A system as claimed in claim 18, wherein the local oscillator signal is transmitted with the output signal or signals.

20. A system as claimed in claim 1, comprising a network analyser.

21. A method of transmitting and receiving an electromagnetic signal, comprising:
generating an output signal, by:
generating simultaneously a plurality of signals with fixed frequency spacing from first and second signal sources using a comb generator, wherein the fixed frequency spacing is between adjacent pairs of comb line signals, wherein there is a plurality of adjacent pairs of comb line signals and wherein the fixed frequency spacing is derived from the frequency of the second signal source which is significantly lower than the frequency of the first signal source;
selecting one or more pairs of the plurality of signals; and
for the or each pair, combining the signals of the pair to derive an output signal having a frequency derived from the difference between the frequencies of the signals of the pair;
transmitting the output signal; and
receiving a signal, which comprises a received version of the output signal, by down-converting the frequency of the received signal, using a local oscillator signal which is derived from the plurality of signals with fixed frequency spacing.

22. A method as claimed in claim 21, wherein the fixed frequency spacing corresponds to a microwave frequency.

23. A method as claimed in claim 21, wherein the output signal has a frequency in the range 100 GHz to 30 THz.

24. A method as claimed in claim 21, used within an imaging apparatus, and wherein the steps of transmitting and receiving are performed by the same apparatus.

25. A system as claimed in claim 1, used within a wireless communications system, and wherein the steps of transmitting and receiving are performed by different parts of the system.

26. A system as claimed in claim 1, wherein the comb generator generates at least one hundred comb lines.

27. A method as claimed in claim 21, wherein the comb generator generates at least one hundred comb lines.

* * * * *